(12) United States Patent
Curry

(10) Patent No.: US 7,750,078 B2
(45) Date of Patent: Jul. 6, 2010

(54) SYSTEMS AND METHODS USED FOR FUNCTIONALIZATION OF POLYMERIC MATERIAL AND POLYMERIC MATERIALS PREPARED THEREFROM

(75) Inventor: Christopher Lewis Curry, Seabrook, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 333 days.

(21) Appl. No.: 11/296,668

(22) Filed: Dec. 7, 2005

(65) Prior Publication Data
US 2007/0129498 A1 Jun. 7, 2007

(51) Int. Cl.
C08F 267/04 (2006.01)
C08F 297/02 (2006.01)
C08F 8/00 (2006.01)
C08L 23/00 (2006.01)

(52) U.S. Cl. .................... 525/54; 525/242; 525/184; 525/191

(58) Field of Classification Search ................ 525/242, 525/54, 184, 191
See application file for complete search history.

(56) References Cited

U.S. PATENT DOCUMENTS

| | | | |
|---|---|---|---|
| 4,064,315 A * | 12/1977 | Bivans et al. | 428/518 |
| 4,751,270 A | 6/1988 | Urawa et al. | 525/244 |
| 4,753,997 A | 6/1988 | Shyu et al. | 525/259 |
| 5,001,197 A | 3/1991 | Hendewerk | 525/285 |
| 5,319,030 A | 6/1994 | Harrison et al. | 525/285 |
| 5,539,057 A * | 7/1996 | Giroux | 525/309 |
| 5,728,776 A | 3/1998 | Takemura et al. | 525/285 |
| 5,998,547 A | 12/1999 | Hohner | 525/301 |
| 6,228,948 B1 | 5/2001 | Flaris et al. | 525/285 |
| 6,331,595 B1 | 12/2001 | Mitchell et al. | 525/263 |
| 6,426,389 B2 * | 7/2002 | Coe | 525/285 |
| 6,437,049 B1 | 8/2002 | Bortolon et al. | 525/240 |
| 6,784,251 B2 | 8/2004 | Lences et al. | 525/221 |
| 6,946,528 B2 | 9/2005 | Domine et al. | 526/64 |
| 7,256,236 B1 * | 8/2007 | Hacker | 525/54 |
| 2001/0012876 A1 | 8/2001 | Wayne | 525/333.7 |
| 2002/0026010 A1 | 2/2002 | Roberts et al. | 525/66 |
| 2004/0054086 A1 | 3/2004 | Schauder et al. | 525/193 |
| 2004/0127614 A1 | 7/2004 | Jiang et al. | 524/270 |
| 2005/0171295 A1 | 8/2005 | Kanamaru et al. | 525/386 |

FOREIGN PATENT DOCUMENTS

| | | |
|---|---|---|
| WO | WO 94/25498 | 11/1994 |
| WO | WO 96/06120 | 2/1996 |
| WO | WO2005/082963 | 9/2005 |

OTHER PUBLICATIONS

Kangshin ASCPI Newsletter, Mitsui Hi-Wax, Feb. 14, 2000, No. 20.*
"Quantification of the Maleic Anhydride Grafted onto Polypropylene by Chemical and Viscosimetric Titrations, and FTIR Spectroscopy", Sclavons et al., Polymer 41 (2000), pp. 1989-1999, Belgium.
"Not All Maleated Polyolefins are Created Equal", Scott M. Hacker, Honeywell International, Inc., ANTEC 2001, 16 pages, Morristown, New Jersey.

* cited by examiner

Primary Examiner—David Wu
Assistant Examiner—Michael M Bernshteyn

(57) ABSTRACT

Disclosed herein is the preparation of reaction products which contain carboxylic acid-grafted functionalized propylene homopolymers and copolymers that can be used as additives for polyolefin-based plastic products such as hot melt adhesives. Such reaction product additives may be prepared by: a) providing a first reactant comprising a selected type of relatively low molecular weight, low melt viscosity, molten propylene-based homopolymer or copolymer; b) forming a reaction mixture by adding to this first reactant a second reactant comprising an unsaturated carboxylic acid-based functionalizing agent, and an initiator comprising a certain type of organic peroxide; and c) maintaining the resulting reaction mixture at a relatively low temperature between about 130° C. and about 165° C. for a period of time and under conditions sufficient to form a reaction product which comprises acid-grafted propylene-based polymeric material, and which has a relatively high Grafting Efficiency.

8 Claims, No Drawings

SYSTEMS AND METHODS USED FOR FUNCTIONALIZATION OF POLYMERIC MATERIAL AND POLYMERIC MATERIALS PREPARED THEREFROM

BACKGROUND

Polyolefin materials, such as homopolymers and copolymers of propylene, which are modified so as to be polar, have many uses. Polar-functionalized polypropylene materials, for example, can be used as additives for or in plastic products to modify the surface characteristics or preparation processability of such products. Functionalized propylene homopolymers and copolymers can also be used for the preparation of aqueous dispersions for car and cleaning products, and may be especially useful as additives for hot melt adhesive formulations to modify the adhesive properties thereof.

Frequently, acid functionalization of propylene homopolymers and copolymers by grafting acidic moieties involves reaction of the molten propylene-based polymer with an unsaturated carboxylic acid or derivative such as maleic anhydride in the presence of a free radical initiator such as an organic peroxide. Preparation of functionalized propylene-based polymers in this general manner is disclosed, for example, in U.S. Pat. Nos. 4,753,997; 5,001,197; 5,319,030; 5,728,776; 5,998,547; 6,228,948; 6,331,595; 6,437,049 and 6,784,251; and in U.S. Patent Applications 2002/0026010 and 2004/0054086.

The manner in which, and the extent to which, acid functionalization, e.g., maleation, of propylene-based polymers (hereinafter called "polypropylene" whether they are homo- or co-polymers) occurs can affect the properties, characteristics, and usefulness of the resulting functionalized polymer-containing reaction product. If too little of the functionalizing acid reactant is grafted to the polymer backbone compared to the total amount of functionalizing agent used, the residual unreacted acid reactant within the reaction product can cause problems.

For example, ungrafted maleic anhydride in a maleation operation, especially if present under reaction conditions such as relatively high temperatures, can result in side products being formed during and after the maleation reaction. When the resulting reaction product is then combined with non-functionalized polyolefin material, for example, in a hot melt adhesive formulation, these side products can cause undesirable color to be imparted to the adhesive formulation. Furthermore, these residual unreacted impurities can lead to poor color stability, polymer molecular weight degradation and char formation upon exposure of the adhesive product to heat. Finally, a hot melt adhesive using a maleation reaction product containing too much of free maleic anhydride or the maleic anhydride-based side products may cause undesirable haze to form within the adhesive product which is preferably clear and haze-free.

The foregoing problems which can be encountered with commercial scale production of functionalized polypropylene-containing reaction products may be eliminated or minimized by improving the efficiency of the grafting (to a given desired extent) of functional moieties onto the polypropylene backbone. It would therefore be advantageous to identify selected combinations of reactants and reaction conditions which can be utilized to realize suitable Grafting Efficiency in preparation of materials of this type which have been functionalized to a certain Grafting Content.

Grafting Efficiency is a quantitative measure of the concentration of carboxylic acid-based functionalizing agent which is covalently bound to the polypropylene backbone. It is defined as the concentration of functionalizing agent grafted onto the polymer backbone as a percentage of the concentration of functionalizing agent within the crude reaction product. Grafting Content quantifies the total amount of functionalizing acid groups which have been grafted onto the polymer backbone in terms of acid number, i.e., the milligrams of neutralizing KOH needed per gram of functionalized polymer.

It may be advantageous to provide effective and suitable values for Grafting Efficiency and Grafting Content, using reaction conditions which do not themselves create or impart undesirable characteristics (e.g., poor color or reduced molten clarity) within the desired polymeric reaction product or within the eventual end products to which such functionalized reaction products may be added.

SUMMARY

Disclosed herein are processes for preparing a reaction product which contains carboxylic acid-grafted functionalized propylene homopolymers and copolymers that can be used as additives for plastic products such as hot melt adhesives. Such processes may comprise: a) combining i) a first reactant comprising a selected type of molten propylene-based homopolymer or copolymer; ii) an initiator comprising a certain type of organic peroxide; and iii) a second reactant comprising an unsaturated carboxylic acid-based functionalizing agent; to form a reaction mixture; and b) maintaining the reaction mixture at a temperature between about 130° C. and about 165° C. until a reaction product comprising acid-grafted propylene-based polymeric material having a relatively high Grafting Efficiency is formed.

In some embodiments, the propylene homopolymers or copolymers used in or as the first reactant are those having a weight average molecular weight of less than about 100,000 g/mol, a crystalline peak melting point, $T_m$, of less than about 157° C. and a melt viscosity of less than about 40,000 cPs at 190° C. The organic peroxide used as an initiator is one which has a decomposition half-life of less than about 30 minutes at the temperature of the reaction mixture. The carboxylic acid-based functionalizing agent is preferably maleic acid or maleic anhydride, and the process is carried out under reaction conditions which provide a reaction product having a Grafting Efficiency of at least about 60%.

In some embodiments of the process for preparing the reaction products herein, the reaction mixture is formed using staged addition of the initiator and the second reactant to the first reactant. Such a staged addition of components preferably may involve repetitively adding separate aliquots of first the initiator and then the second reactant to the first reactant, with each such subsequent addition of an aliquot occurring after a period of time related to the half-life of the initiator. The aliquots of initiator may also be added to the first reactant all at once. The aliquots of the second reactant, on the other hand, are preferably added to the reaction mixture slowly over a period of time equal to about 1.5 to 2.5, more preferably about 2, times the half-life of the peroxide initiator.

Other embodiments are directed to the functionalized polypropylene-containing reaction product itself and to plastic products, such as those containing non-functionalized polyolefins, to which such reaction products have been added. The reaction product may contain functionalized propylene homopolymers and copolymers having a Grafting Content of greater than about 5 mg of KOH per gram of functionalized polymeric material. When such reaction products are used as additives in plastic products such as hot melt adhesives, the relatively small amounts of unreacted functionalizing agents or by-products thereof in the additive do not impart undesirable properties (e.g., undesirable color or color intensity, haze or turbidity, or thermal instability) to such plastic products.

DETAILED DESCRIPTION

The polymeric materials which are acid-functionalized as disclosed herein are propylene-based homopolymers and copolymers. It is preferred that the polymeric materials be substantially free of haze. If the starting polymeric materials are cloudy, it is anticipated that the functionalized product may be cloudy. Non-exclusive examples of acceptable starting materials are initially substantially haze-free polymeric material made via either a Ziegler-Natta catalyzed process or a metallocene catalyzed process. Further non-exclusive examples of acceptable starting material are higher molecular weight polymeric materials which have been cracked to produce lower molecular weight starting materials at any time prior to functionalization as disclosed herein. In essence, it is not critical that the starting polymeric material be from any particular source, so long as it is substantially haze free if a haze free product is desired.

In some embodiments, when copolymers are to be functionalized, the polypropylene copolymers useful as starting materials herein can be prepared by polymerizing propylene with a $C_2$ or $C_4$-$C_{20}$ alpha olefin, most preferably propylene and ethylene or hexene, in the presence of a Ziegler or chiral metallocene catalyst with an activator and optional scavenger. The comonomer used with propylene may be linear or branched. Preferred linear alpha-olefins include ethylene or $C_4$ to $C_8$ α-olefins, more preferably ethylene, 1-butene, 1-hexene, and 1-octene, even more preferably ethylene or 1-hexene. Preferred branched alpha-olefins include 4-methyl-1-pentene, 3-methyl-1-pentene, and 3,5,5-trimethyl-1-hexene.

Preferred polypropylene copolymers have an average propylene content on a molar basis of from about 75% to about 99%, more preferably from about 85% to about 98%, even more preferably from about 90% to about 97%, most preferably from about 92% to about 96%. The balance of the copolymer comprises one or more alpha-olefins as specified above and optionally minor amounts of one or more diene monomers.

Preferably, the polypropylene copolymer comprises 1-hexene as the comonomer in the range of from about 0.3 to about 11.2 mole %, more preferably from about 1.1 to about 8.6 mole % 1-hexene, even more preferably from about 1.9 to about 6.2 mole % 1-hexene, and most preferably from about 2.7 to 3.4 mole % 1-hexene.

In some embodiments, the propylene homopolymers and copolymers preferably have a weight average molecular weight, $M_w$, of less than about 100,000 g/mol. More preferably, the propylene-based polymers which are functionalized in accordance with the invention herein will have an $M_w$ ranging from about 20,000 to about 80,000 g/mol, most preferably from about 30,000 to about 50,000 g/mol. Weight average molecular weight for these polymeric materials can be determined in standard fashion using gel permeation chromatography.

In some embodiments, the polypropylene homopolymers and copolymers are also those which have a crystalline peak melting point, $T_m$, of less than about 157° C. More preferably, such polymeric materials will have a $T_m$ value of from about 125° C. to about 145° C. Peak melting point ($T_m$), peak crystallization temperature ($T_c$), (as well as heat of fusion and crystallinity) can be determined using the following procedure according to ASTM E 794-85. Differential scanning calorimetric (DSC) data are obtained using a TA Instruments Model 2920 machine. Samples weighing approximately 7-10 mg are sealed in aluminum sample pans. The DSC data are recorded by first cooling the sample to −50° C. and then gradually heating it to 200° C. at a rate of 10° C./minute. The sample is kept at 200° C. for 5 minutes before a second cooling-heating cycle is applied. The second cooling and heating cycle thermal events are then recorded. For polymers displaying multiple melting or crystallization peaks, the highest melting peak is taken as peak melting point, and the highest crystallization peak is taken as peak crystallization temperature.

In some embodiments, the propylene homopolymers and copolymers are further those which have a relatively low melt viscosity. Generally, melt viscosity of these polymeric materials will be less than or equal to about 40,000 cPs at 190° C. More preferably, melt viscosity at 190° C. will range from about 400 to about 10,000 cPs, most preferably from about 500 to about 3,000 cPs. Melt viscosity is measured generally in accordance with the procedures of ASTM D-3236 using a Brookfield Thermosel viscometer and a number 27 spindle.

Preferred propylene-based polymers will also have a Ring and Ball softening point of less than about 157° C. More preferably, the propylene homopolymers and copolymers functionalized in accordance with this invention will have a Ring and Ball softening point of from about 125° C. to about 145° C. Ring and Ball softening point is determined by the ASTM E28 procedure.

To functionalize the propylene-based polymers of the foregoing type, these polymeric materials may be reacted with an unsaturated, carboxylic acid-based functionalizing agent. This functionalizing agent comprises at least one ethylenically unsaturated carboxylic acid or acid derivative, such as an acid anhydride, ester, salt, amide, imide, or the like. Such agents include but are not necessary limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methylbicyclo(2.2.1)hept-5-ene-2,3-dicarboxylic acid anhydride (XMNA). Other monomers might include, but are not limited to, those with at least one ethylenically unsaturated moiety and one or more of the following groups: epoxies, isocyanates, thiocyanates, siloxanes, N-hydroxymethylacrylamides, acyl chlorides.

Preferred specific acid functionalizing agents are those selected from the group consisting of maleic acid, maleic anhydride, fumaric acid, acrylic acid, methacrylic acid, crotonic acid, citraconic anhydride, aconitic anhydride, iticonic acid, itaconic anhydride, dimethyl maleate, dimethyl fumarate, methyl ethyl maleate, dibutyl maleate, and combinations thereof. Of all of these, maleic anhydride and maleic acid are the most preferred.

The reaction between the propylene-based polymeric materials herein and the acid functionalizing agents takes place in the presence of a free radical-generating initiator compound. In some embodiments, an initiator will take the form of an organic peroxide compound. The peroxide initiator is selected herein to have a decomposition half-life which is suitable for use under the relatively low temperature conditions under which the acid-grafted functionalization reaction between polymer and functionalizing agent takes place.

The $t_{1/2}$ (half-life) of an organic peroxide is its thermally-induced decomposition rate. It is the time required for decomposition of 50% of the original amount of initiator at a given temperature. The $t_{1/2}$ is typically determined by differential scanning calorimetry-differential thermal analysis (DSC-TAM) of a dilute solution of the peroxide in question. The $t_{1/2}$ may be calculated from the Arrhenius equation $k_d = A(e^{-Ea/RT})$ and $t_{1/2} = \ln 2/k_d$, where:

$k_d$=the rate constant for the dissociation in s$^{-1}$
A=the Arrhenius factor in s$^{-1}$
$E_a$=the activation energy for the peroxide dissociation in J/mol
R=8.3142 J/mol-K
T=temperature in K
$t_{1/2}$=peroxide half-life in seconds In some embodiments, the organic peroxide employed is one which will have a half-life of less than about 30 minutes at the temperature of the reaction mixture. More preferably, the half-life of the organic peroxide initiator will range from about 3 to about 5 minutes at the reaction temperatures used. The peroxide used in the instant process preferably possesses a half-life less than or equal to that of Luperox® 101, [2,5-di-methyl-2,5-di(t-butylperoxy)-hexane], a peroxide often used as an initiator in similar reactions carried out at temperatures somewhat higher than those specified for the functionalization reaction of this invention. (Luperox® 101 has a half-life of 31.9 minutes at 140° C. as measured as a 0.2M solution in dodecane.)

Subject to the foregoing, the organic peroxide initiator may be selected from a wide variety of dialkyl peroxides, diacyl peroxides, diperoxyketals, hydroperoxides, ketone peroxides, peroxydicarbonates, peroxyesters and combinations thereof. Preferred initiators include di-t-butyl peroxide, t-butyl hydroperoxide, t-butyl peroxybenzoate (Luperox® P), OO-(t-amyl)O-(2-ethylhexyl)monoperoxycarbonate (Luperox® TAEC), OO-(t-butyl)O-(2-ethylhexyl)monoperoxycarbonate (Luperox® TBEC), and 1,1-di(t-amylperoxy)-cyclohexane (Luperox® 531M80).

The functionalization of the propylene polymers herein may be brought about by adding both the above-described functionalizing agent comprising a "second" reactant, and the above-described initiator material(s), to the "first" reactant comprising the molten polypropylene material to be functionalized. Addition of the initiator material(s) and this second reactant to the first reactant to form a reaction mixture may be carried out incrementally, sequentially, simultaneously or using special staged addition of components as hereinafter described.

In preferred embodiments of the functionalization process herein, the first and second reactants and the initiator are combined, and the functionalization reaction is carried out, in a specific manner related to the half-life of the peroxide initiator which is used. In particular, when the initiator and the second reactant comprising the functionalizing agent are combined with the first reactant comprising the polypropylene to be functionalized, this combination is preferably effected by sequentially adding to the first reactant alternating aliquots of first the initiator and then the second reactant. Generally in this preferred reactant addition scheme, the total amount of initiator and the total amount of the second reactant to be used each will be added in at least two separate aliquots and preferably only two separate aliquots of each.

The addition of each aliquot of the initiator and second reactant components is furthermore preferably timed to allow the reaction mixture resulting from the aliquot addition to react for a time interval equal to from about 80% to 120% of the half-life of the organic peroxide (at the temperature of the reaction mixture) after complete addition of each such aliquot and before the next aliquot is added. Even more preferably, the reaction mixture is allowed to react for a time interval which is approximately equal to the half-life of the initiator at the reaction mixture temperature before the next aliquot is added.

Finally, there is also a preferred timing for the duration of the addition of aliquots of initiator and second reactant respectively. In particular, it is preferred that the initiator aliquots be added to the reaction mixture instantly or all at once, while the second reactant aliquots should be added to the reaction mixture slowly over a time interval equal to from about 1.5 to 2.5 times the half-life of the organic peroxide initiator (at the reaction mixture temperature.) Most preferably, the initiator aliquots will be added instantly, and the second reactant aliquots will be added slowly over a time interval which is equal to about twice the half-life of the peroxide initiator at the temperature of the reaction mixture. For purposes of this invention, initiator addition "instantly" or "all at once" means addition during a time interval which is as short as practical, consistent with the component amounts, component rheology, method of addition, and apparatus utilized.

No matter what the reactant addition scheme, in adding the second reactant to the first, enough of this second reactant is utilized so that the unsaturated carboxylic acid-based functionalizing agent comprises, on a pre-reaction basis, from about 0.1 wt % to about 10 wt % of the ultimate combination of first reactant, second reactant, and initiator. More preferably, this functionalizing agent will comprise from about 0.5% to about 6% by weight of the ultimate combination of first reactant, second reactant and initiator, even more preferably from about 2% to about 5% by weight of this ultimate combination of components. Stated in other terms, the process of the present invention will generally be carried out using a weight ratio of polypropylene to functionalizing agent of from about 10 to about 1,000, more preferably from about 15 to about 200, and most preferably from about 20 to about 50.

In adding the initiator component to the first reactant, enough of the initiator material(s) are utilized so that the initiator material(s) comprise, on a pre-reaction basis, from about 0.1 wt % to about 5 wt % of the ultimate combination of first reactant, second reactant, and initiator. More preferably, this initiator component will comprise from about 0.5% to about 2% by weight of the ultimate combination of first reactant, second reactant and initiator. Stated in other terms, the process of the present invention will generally be carried out using a molar ratio of polypropylene to initiator component of from about 20 to about 1,000, more preferably from about 50 to about 200.

In some embodiments, once combined, the first and second reactants are maintained at a reaction temperature between about 130° C. and about 165° C., more preferably from about 140° C. to about 150° C., for a period of time sufficient to form a reaction product comprising the acid-grafted propylene-based polymeric materials. From the point that the first and second reactants and the initiator have been completely combined, reaction temperature will generally be maintained for a period of from about 3 to about 6 times the half-life of the organic peroxide initiator at the reaction temperature used. In many instances, reaction time will therefore range from about 10 to about 70 minutes. Reaction temperature may or may not be maintained at a constant value within the requisite range during the functionalization reaction.

The functionalization reaction may be carried out in any suitable reactor apparatus within which reactants can be combined in the manner and within which reaction conditions can be effectively controlled. Thus a batch reactor may be employed. Alternatively a continuous, stirred tank reactor, a semi-batch reactor, a tubular reactor, a plug-flow reactor or an extruder may be used to carry out the process of the present invention.

By utilizing the selected reactants and reaction conditions disclosed herein, a reaction product may be obtained wherein a relatively large proportion of the acid functionalizing agent charged to the reaction mixture has been covalently bound to the propylene polymeric material and, accordingly, wherein a relatively small amount of the second reactant, either in the form of monomer or oligomer, remains within the reaction product.

The method described by M. Sclavons et al. (Polymer, 41(2000), pp. 1989-1999) (available at www.sciencedirect.com/science/journals) is used to determine the maleic anhydride content of the maleated polypropylene. In such a method, about 1.0 gram of the maleated polypropylene is dissolved in 100 mL of toluene at reflux temperature. A titration with tetra-butylammonium hydroxide using phenolphthalein in methanol as the color indicator is performed on the heated solution in which the polypropylene does not precipitate during the titration.

Functionalized polypropylene material produced can be separated from the reaction product mixture for analysis. Generally this functionalized polypropylene material from the reaction product mixture will have a certain Grafting Content as quantified by the acid number of this functionalized polymeric material. Acid number is defined as the number of milligrams of KOH which are required to neutralize one gram of the functionalized polymeric sample. The titration method of Sclavons et al. provide values that are equivalent to those obtained from traditional acid number tests using KOH. As such, all titration results using the method of Sclavons et al. are reported as mg KOH/g resin.

The maleic anhydride content ascertained in the foregoing manner is determined on both "crude" and "cleaned" versions of the maleated polypropylene reaction product. The "crude" version is a sample taken directly after the maleation reaction is performed. The "cleaned" version is a sample obtained by dissolving approximately 5 grams of the "crude" product in 100 mL of toluene at reflux temperature, followed by the slow addition of acetone to precipitate the maleated polypropylene. The precipitated maleated polypropylene is filtered from the acetone/toluene mixture, then dried under vacuum for 48 hours at 105° C. This procedure removes the residual maleic anhydride (monomeric or oligomeric) from the maleated polypropylene.

M. Sclavons et al. (Polymer, 41(2000), pp. 1989-1999) reports that the molar stoichiometry ratio of the reaction between tetra-butylammonium hydroxide and maleic anhydride is 1:1. Using this value, the weight percent of maleic anhydride within both the "crude" and "cleaned" maleated polypropylene samples is calculated from the values obtained from the titration experiments described herein. The "Grafting Efficiency" is calculated as the percentage of maleic anhydride covalently bound to the polypropylene backbone (determined from "cleaned" maleated sample) versus the total maleic anhydride content of the "crude" maleated polypropylene. The "Grafting Content" is the concentration of maleic anhydride within the "cleaned" sample and is expressed in mg KOH/g of polymeric resin.

The reaction product resulting from the processes disclosed herein may generally have a Grafting Efficiency value of at least about 60%. More preferably, this reaction product will have a Grafting Efficiency of from about 70% to about 90%.

It is preferred that the functionalized polypropylene material produced will have a Grafting Content of greater than about 5 mg of KOH per gram of functionalized polymeric material. More preferably the functionalized polypropylene material produced by the instant process will have a Grafting Content of from about 10 to about 40 mg of KOH per gram of functionalized polymeric material, even more preferably from about 12 to about 30 mg KOH/g.

Acid-grafted functionalized propylene polymer-containing reaction products can be used as, or as ingredients and additives for, a wide variety of products wherein some degree of polarity or functionality is needed on some of the components of these products in order, for example, to modify the stability, rheology, surface characteristics, adhesion or processability of such products. Thus, functionalized propylene homopolymers and copolymers can be used for, without limitation, the preparation of aqueous dispersions for car and cleaning products, and can also be used in a variety of non-aqueous polymeric products wherein they can act as adhesion promoters between polyolefins and substrates such as glass, metal, and engineering plastics such as polyamides. Functionalized polypropylenes are in fact widely used in hot melt products such as hot melt adhesives. These functionalized propylene-based materials may also find use, for example, in films or in a variety molded articles which can be manufactured from polyolefins.

The functionalized polypropylene-containing reaction products disclosed herein may be used in polymer blends or mixtures containing unfunctionalized polyolefins such as polypropylene. In hot melt products, such as hot melt adhesives, the reaction products of this invention may comprise from about 0.1% to about 10% by weight of the hot melt product. More preferably, the functionalized polypropylene-containing reaction products herein comprise from about 1% to about 5% by weight of such hot melt compositions. Hot melt adhesives comprising the polymer blends or mixtures disclosed and claimed may also comprise additional components selected from the group consisting of polyethylene waxes, polypropylene waxes, hydrocarbon tackifiers and combinations of these additional components. These and other components of hot melt adhesives are described in greater detail in U.S. Pat. No. 6,946,528, incorporated herein by reference.

The polymer blends or mixtures herein comprising functionalized polypropylene-containing reaction products, when solidified, may also comprise at least one layer, e.g., a tie layer, of polymeric films which may be polyolefin based. The polymer blends or mixtures herein with their functionalized polypropylene-containing reaction product component may also be used to prepare molded articles of manufacture which are likewise frequently polyolefin-based. Such articles can be blow-molded using injection, extrusion or stretch techniques.

When used in hot melt products such as hot melt adhesives or other products, it may frequently be important that the functionalized polypropylene-containing components thereof not impart, by virtue of any residual unreacted functionalizing agent or functionalizing agent by-products therein, any undesirable optical characteristics to the hot melt products to which they are added. For example, in many hot melt adhesive applications, it is important that undesirable color characteristics or color intensities be avoided. It is also frequently important that the use of functionalized polymeric additives not impart undesirable haze or turbidity to the hot melt adhesive which for aesthetic, commercial or marketing reasons may need to remain at least mostly clear or transparent when molten.

It has been found that by preparing the functionalized polypropylene-containing reaction products in accordance with the processes herein, the resulting relatively high Grafting Efficiency for such products makes them especially suitable for use in products such as hot melt adhesives wherein the aforementioned desirable optical properties are needed. Without being bound by any particular theory, because there are relatively small amounts of ungrafted functionalizing agent present in the reaction product mixture upon completion of the grafting reaction, the propensity of free functionalizing agent, or by- or side-products thereof, to cause problems (discoloration, poor thermal stability, char formation) within the products they are added to is diminished or effectively eliminated. Additionally, commercial production of functionalized polypropylene-containing reaction products of high Grafting Efficiency may also be more cost effective in that a relatively high proportion of the functionalizing agent raw material consumed is used to bring about polypropylene functionalization.

As noted, use of functionalized polypropylene-containing reaction products of high Grafting Efficiency leads to realization of hot melt formulations wherein the optical, i.e., color and/or clarity, properties of such reaction products and the formulations they are combined with may be aesthetically suitable for their desired end use. With respect to color and color intensity, this means that whatever color or tint which might be imparted to the hot melt formulation by the reaction products herein is noticeably diminished in intensity in comparison with similar reaction products having Grafting Efficiency values generally lower than those of the reaction products of the present invention. Frequently, the functionalized polypropylene-containing reaction products herein will have a Gardner Color Index [ASTM D6166] of less than about 8, less than about 6, or less than about 4.

With respect to the clarity of hot melt formulations containing the functionalized polypropylene-containing reaction products disclosed and claimed herein, such hot melt formulations, when molten, will be generally clear and substantially haze-free both initially, and after being held at a temperature of 177° C. for a period of 24 hours. Such a feature regarding polymer formulation clarity can generally be determined by simple visual inspection.

EXAMPLES

The preparation of functionalized polypropylene-containing reaction products, including those disclosed and claimed, as well as certain hot melt products containing these reaction products can be illustrated by the following examples. In these examples, various polypropylene starting materials which are described as follows and have the properties set forth in Table 1 are functionalized with maleic anhydride in the presence of various peroxide initiators which are also described as follows. The general procedure for conducting these maleation reactions is described as follows. Reaction conditions and results are set forth in Tables 2A and 2B. It will be understood by one of ordinary skill in the art that the examples disclosed herein are presented for illustration purposes, and it is not intended that the claims be limited to these examples or their specific conditions.

General Maleation Procedure:

Maleated polypropylenes are synthesized in a 400 mL glass beaker equipped with stirrer, thermocouple, and heating mantle. The mixing speed ranges from 150-350 RPM throughout the entire reaction. The presence of atmospheric oxygen is not desirable during the functionalization process; therefore, the concentration of atmospheric oxygen is minimized by a constant nitrogen flow above the reaction mixture.

After the polypropylene is allowed to completely melt at the reaction temperature (e.g., 140° C.), the organic peroxide and maleic anhydride are added in aliquots of first the peroxide and then the maleic anhydride. Complete addition of each aliquot is separated by a time interval approximately equal to the half-life of the peroxide initiator. In this procedure, half of the total amount of peroxide used is added all at once as the first aliquot of initiator. After a period of time approximately equal to the peroxide half-life, half of the total amount of maleic anhydride to be used is then added slowly to the reaction mixture over a time interval equal to about twice the half-life of the organic peroxide. Then after another time interval approximately equal to the peroxide half-life, this procedure is repeated to add the rest of the peroxide and the rest of the maleic anhydride in the same manner. Combination of reactants in this or similar manner is referred to herein as "staged addition" of reactants.

After complete addition of the organic peroxide initiator and the maleic anhydride, the reaction is allowed to continue for an additional time interval equal to 5 times that of the $t_{1/2}$ of the organic peroxide employed. Volatile constituents of the reaction mixture are removed by passing nitrogen through the molten components for 30 minutes. The "crude" molten maleated polypropylene is decanted into a silicon-lined container and allowed to cool before characterization. Preparation and recovery of the "cleaned" maleated product is described herein in connection with the disclosure concerning Grafting Efficiency.

Polypropylenes of the Examples

Polymer A is an experimental homopolypropylene prepared according to the general procedures described in U.S. Patent Publication No. 2004/0127614, incorporated herein by reference.

Polymer B is an experimental copolymer of propylene and 1-hexene also prepared according to the general procedures described in U.S. Patent Publication No. 2004/0127614, incorporated herein by reference.

Polymer C is Eastoflex® 1003, a copolymer of propylene and ethylene available from by Eastman Chemical Company.

Polymer D is Licocene® 1302, a metallocene-catalyzed homopolypropylene available from Clariant.

Polymer E is Rextac® 2304, a copolymer of propylene and ethylene available from Huntsman Polymers.

Polymer F is a degradation wax prepared from a commercially-available homopolypropylene with an initial MFR of 1500 g/10 min.

Thermal and rheological characteristics of these polymers are given in Table 1.

TABLE 1

| Polypropylene | Melt Viscosity @ 190° C. (cPs) | Ring & Ball Softening Point (° C.) | Peak Melting Point, $T_m$ (° C.) |
|---|---|---|---|
| A | 923 | 142 | 124 |
| B | 400 | 124 | 111 |
| C | 250 | 120 | 119 |
| D | 60 (@170° C.) | 145 | 146 |
| E | 400 | 138 | 137 |
| F | 2000 | 152 | 155 |

Organic Peroxides of the Examples

Luperox® 101 is an organic peroxide (2,5-Di(t-butylperoxy)-2,5-dimethylhexane) available from Arkema, Inc.

Luperox® P is an organic peroxide (t-Butyl Peroxybenzoate) available from Arkema, Inc.

Luperox® TBEC is an organic peroxide (OO-(t-Butyl)O-(2-Ethylhexyl)Monoperoxycarbonate), available from Arkema, Inc.

Luperox® 531M80 an organic peroxide (1,1-Di(t-amylperoxy)-cyclohexane) available from Arkema, Inc.

Reaction Conditions and Maleation Results

TABLE 2A

|  | Example 1 | Example 2 | Example 3 | Comparative |
|---|---|---|---|---|
| Propylene ID | A | B | B | A |
| Propylene (g) | 140 | 140 | 140 | 140 |
| Luperox ® P (g) | 1.1 | — | — | — |
| Luperox ® 531M80 (g) | — | 8.6 | — | — |
| Luperox ® TBEC | — | — | 6.3 | — |
| Luperox ® 101 (g) | — | — | — | 4.0 |
| Maleic Anhydride (g) | 3.5 | 9.4 | 9.4 | 6 |
| Reaction Temp (° C.) | 140 | 130 | 145 | 190 |
| Reactant Addition Scheme | Staged | Staged | Staged | Staged |
| Total Reaction Time (min) | 64 | 104 | 48 | 30 |
| [MA] of "Crude" Maleated Polypropylene (wt %) | 2.2% | 5.4% | 5.6% | 3.2% |
| [MA] of "Clean" Maleated Polypropylene (wt %) | 1.9% | 4.0% | 4.4% | 1.5% |
| Grafting Content (mg KOH/g) | 11.2 | 23.6 | 25.9 | 8.8 |
| Grafting Efficiency (%) | 86.4% | 74.1% | 78.6% | 46.9% |

TABLE 2B

|  | Example 4 | Example 5 | Example 6 | Example 7 |
|---|---|---|---|---|
| Propylene ID | C | D | E | F |
| Propylene (g) | 140 | 140 | 140 | 190 |
| Luperox ® P (g) | 1.1 | — | 1.1 | — |
| L-101 (g) | — | — | — | 4 |
| Luperox ® TBEC | — | 1.3 | — | — |
| Maleic Anhydride (g) | 3.5 | 9.4 | 3.5 | 7.2 |
| Reaction Temp (° C.) | 140 | 150 | 140 | 165 |
| Reactant Addition Scheme | Staged | Staged | Staged | Staged |
| Total Reaction Time (min) | 64 | 40 | 64 | 30 |
| [MA] of "Crude" Maleated Polypropylene (wt %) | 2.1% | 5.8% | 1.9% | 3.6% |
| [MA] of "Clean" Maleated Polypropylene (wt %) | 1.4% | 4.2% | 1.3% | 2.5% |
| Grafting Content (mg KOH/g) | 8.4 | 24.7 | 7.7 | 14.9 |
| Grafting Efficiency (%) | 66.7% | 72.4% | 68.4% | 69.4% |

Hot Melt Adhesive Formulations:

Hot melt adhesive formulations are prepared comprising homopolypropylene (similar in type and characteristics to Polymers A and B described in the above examples) and the various functionalized polypropylene reaction products described in Tables 2A and 2B. These formulations are hand mixed at 177° C. and allowed to stand for 1 hour. After this period, the hot melt adhesive formulations are qualitatively examined for color and clarity. With respect to clarity, each is characterized in one of the following three categories: hazy, moderate, or clear.

Amounts of each component, their characteristics, and color and clarity properties of the resulting hot melt adhesives are set forth in Tables 3A and 3B:

TABLE 3A

|  | Example 1 | Example 2 | Example 3 | Comparative |
|---|---|---|---|---|
| Maleated Propylene Polymer | A | B | B | A |
| Maleation Temp. (° C.) | 140 | 130 | 145 | 190 |
| Total Maleation Time (min) | 64 | 104 | 48 | 30 |
| Grafting Efficiency (%) | 86.4% | 74.1% | 78.6% | 46.9% |
| Reaction Product Amount (g) | 4 | 4 | 4 | 4 |
| Homopolymer Amount (g) | 96 | 96 | 96 | 96 |
| Adhesive Color/Intensity | yellow/weak | yellow/weak | yellow/weak | yellow/strong |
| Adhesive Clarity | Clear | Clear | Clear | Hazy |

TABLE 3B

|  | Example 4 | Example 5 | Example 6 | Example 7 |
|---|---|---|---|---|
| Maleated Propylene Polymer | C | D | E | F |
| Maleation Temp (° C.) | 140 | 150 | 140 | 165 |
| Total Maleation Time (min) | 64 | 40 | 64 | 30 |
| Grafting Efficiency (%) | 66.7% | 72.4% | 68.4% | 69.4% |
| Maleated Polymer Amount (g) | 4 | 4 | 4 | 4 |
| Homopolymer Amount (g) | 96 | 96 | 96 | 96 |
| Adhesive Color/Intensity | brown/weak | yellow/moderate | yellow/moderate | yellow/strong |
| Adhesive Clarity | Moderate | Moderate | Moderate | Moderate |

The data in Tables 2A, 2B, 3A and 3B show that reduction in reaction temperature and selection of appropriate reactants can increase grafting efficiency during polypropylene maleation reactions, especially when a staged addition of reactants is used. The resulting maleated reaction products can be easily created, are low in viscosity, substantially free of crosslinked material, and have little or no color. When added to hot melt adhesives, these maleated reaction products produce adhesives which have no or acceptably low haze and which also have desirable color and color intensity properties.

While preferred embodiments and examples of the invention have been disclosed herein, it will be understood that various modification can be made without departing from the scope of the invention. Should the disclosure of any of the patents and/or publications that are incorporated herein by reference conflict with the present specification to the extent that it might render a term unclear, the present specification shall take precedence.

What is claimed is:

1. A process comprising:
   a) combining to form a reaction mixture
      (i) a first reactant comprising a molten copolymer of propylene and 1-hexene comprising at least 50 mol % of propylene where the copolymer has a branching index (g') of 0.95 or less measured at the z-average molecular weight (Mz) said polymer having a weight average molecular weight of less than or equal to about 100,000 g/mol, a crystalline peak melting point ($T_m$) of between 40-130° C., and a melt viscosity of less than or equal to about 40,000 cPs at 190° C.;

(ii) an initiator comprising an organic peroxide having a decomposition half-life of less than about 30 minutes at the temperature of said reaction mixture; and (iii) a second reactant comprising an unsaturated carboxylic acid-based functionalizing agent, wherein the aliquots of initiator are completely added to the reaction mixture all at once and wherein the aliquots of the second reactant are added to the reaction mixture over a time interval equal to from about 1.5 to about 2.5 times the half-life of the organic peroxide and wherein the combining step comprises sequentially adding to the first reactant alternating aliquots of first the initiator and then the second reactant with addition of each such aliquot timed to allow the reaction mixture resulting from said aliquot addition to react for a time interval equal to from about 80% to 120% of the half-life of the organic peroxide after complete addition of each such aliquot before the next aliquot is added, b) maintaining the resulting reaction mixture at a temperature of 130° C. to form a reaction product comprising acid-grafted propylene-based polymeric material, and having a Grafting Efficiency of at least about 70% and a Gardner Color Index of less than about 4; and c) using the reaction product in a hot melt adhesive.

2. A process according to claim 1 wherein the unsaturated carboxylic acid-based functionalizing agent is selected from the group consisting of maleic acid, maleic anhydride, fumaric acid, acrylic acid, methacrylic acid, crotonic acid, citraconic anhydride, aconitic anhydride, itaconic acid, itaconic anhydride, dimethyl maleate, dimethyl fumarate, methyl ethyl maleate, dibutyl maleate, and combinations thereof.

3. A process according to claim 2 wherein the organic peroxide is selected from the group consisting of dialkyl peroxides, diacyl peroxides, diperoxyketals, hydroperoxides, ketone peroxides, peroxydicarbonates, peroxyesters and combinations thereof.

4. A process according to claim 1 wherein the reaction mixture is maintained at reaction temperature for a period of from about 3 to about 6 times the half-life of said organic peroxide initiator at the reaction temperature after the reaction mixture has been completely formed.

5. A process according to claim 1 wherein the unsaturated carboxylic acid-based functionalizing agent comprises from about 0.1 wt % to about 10 wt % of the combination of first reactant, second reactant and initiator.

6. A process according to claim 5 wherein the organic peroxide initiator initially comprises from about 0.1 wt % to about 5 wt % of the combination of first reactant, second reactant and initiator.

7. A process according to claim 1 wherein the combination of reactants and reaction product formation is carried out in a batch reactor, a tubular reactor or an extruder.

8. A process according to claim 1 wherein the molten propylene-based homopolymer or copolymer is substantially haze free.

* * * * *